United States Patent [19]

Penfield, Jr. et al.

[11] 3,731,381
[45] May 8, 1973

[54] ROTATABLE WELD CUTTING TOOL

[75] Inventors: Scott R. Penfield, Jr., Warren W. Roberts, both of Chattanooga, Tenn.

[73] Assignee: Combustion Engineering Inc., Windsor, Conn.

[22] Filed: Nov. 18, 1970

[21] Appl. No.: 90,510

[52] U.S. Cl. ..................30/124, 30/97, 30/276
[51] Int. Cl. ..........B25f 3/00, B26b 1/00, B26b 3/00
[58] Field of Search.....................30/124, 96, 95, 97, 30/276, 300; 82/4, 20; 90/24.03, 24.05

[56] References Cited

UNITED STATES PATENTS

| 1,020,795 | 3/1912 | Borden | 30/95 |
| 2,672,682 | 3/1954 | Studebaker et al. | 30/97 |

FOREIGN PATENTS OR APPLICATIONS

| 715,297 | 8/1965 | Canada | 30/300 |
| 940,975 | 3/1956 | Germany | 30/95 |

Primary Examiner—James L. Jones, Jr.
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

Apparatus is disclosed for detaching seal-welded heater elements from assembly with the pressurizer of a pressurized water nuclear power system. The heater elements are of the type that are connected to the pressurizer by both a seal weld and a mechanical back-up connection. The disclosed arrangement involves the use of the nut that forms part of the back-up connection as means for connecting a rotary weld cutter to its drive motor. A weld cutter of particular design capable of removing the seal weld without damaging the heater element is also described.

7 Claims, 13 Drawing Figures

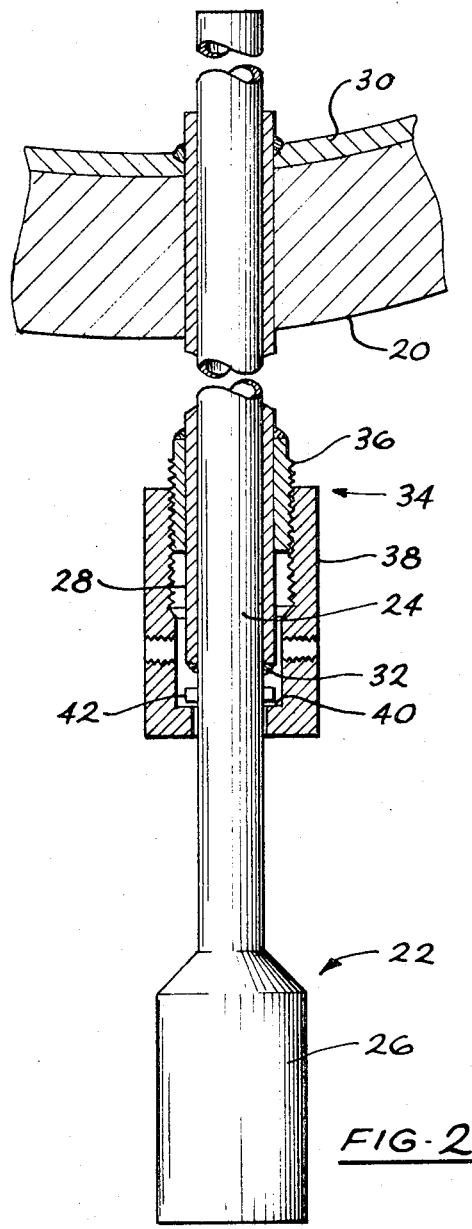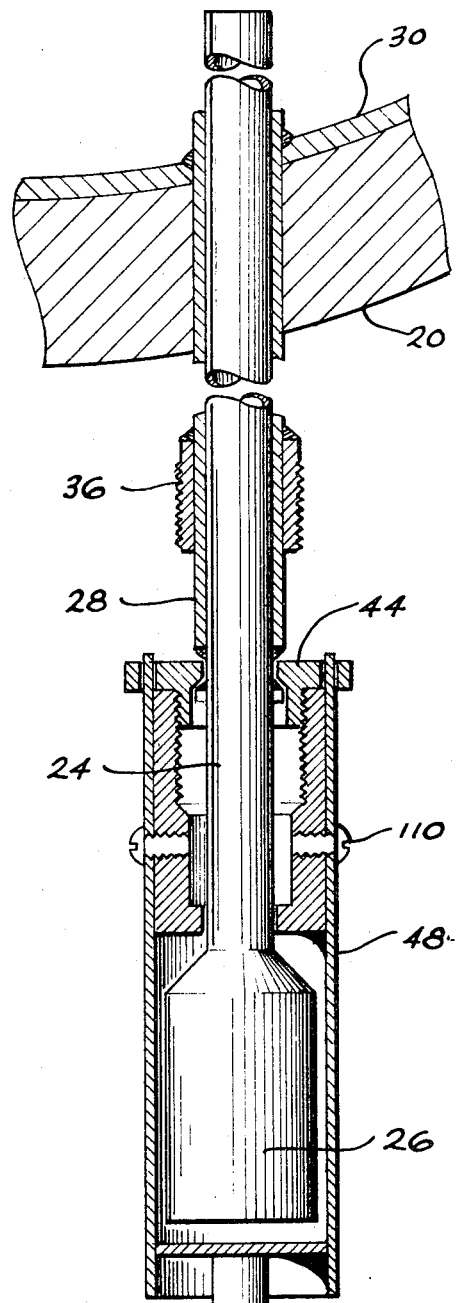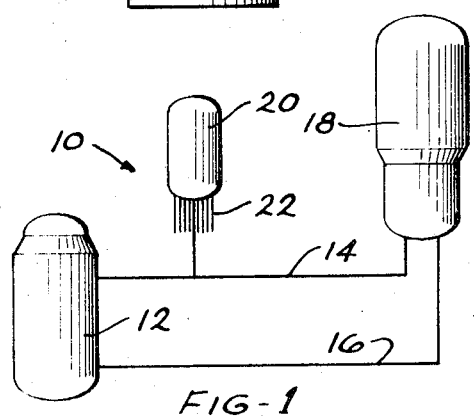

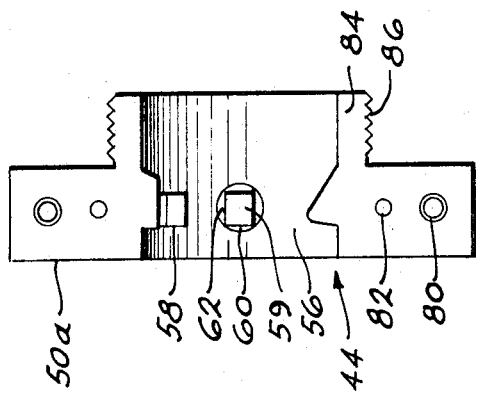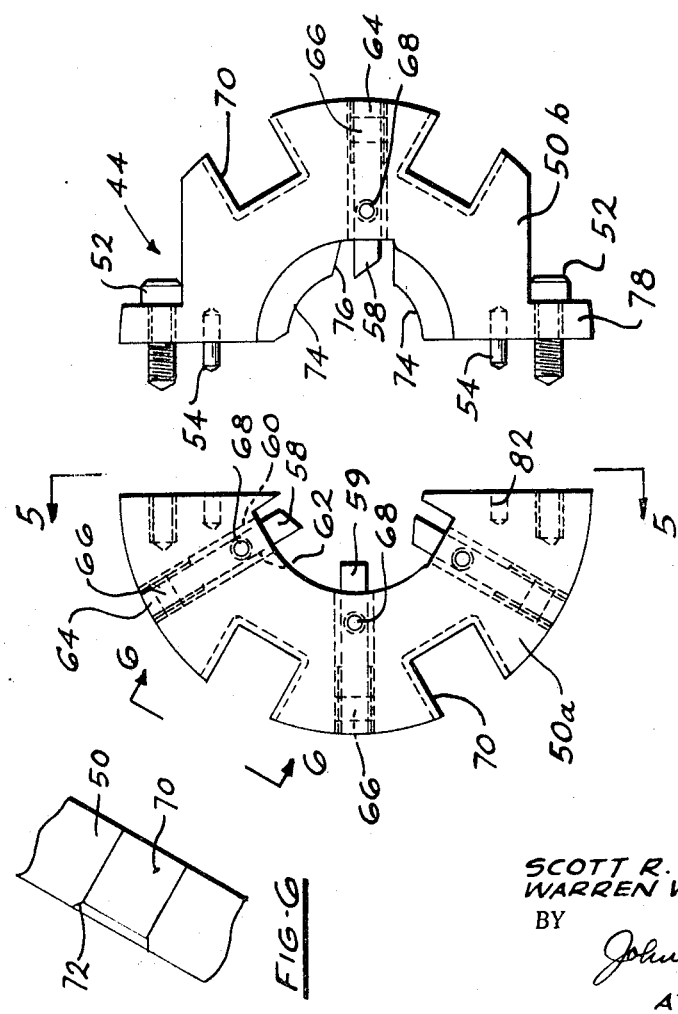

INVENTOR.
SCOTT R. PENFIELD JR.
WARREN W. ROBERTS
BY
John F. Carney
ATTORNEY 3,731,381

ROTATABLE WELD CUTTING TOOL

BACKGROUND OF THE INVENTION

Nuclear vapor generating plants of the pressurized water type include pressurizers which serve principally to maintain the fluid pressure of the primary coolant system within predetermined limits during various stages of system operation. Pressurizers commonly employed in such systems comprise pressure vessels containing a body of saturated liquid into which a plurality of heater elements are caused to extend. The heater elements are operated to add heat to the liquid in order to adjustably maintain a vapor head within the vessel and thereby regulate the fluid pressure of the primary coolant system.

Heater elements of the disclosed type are electrically operated and extend through sleeves that penetrate the lower closure head of the vessel into the interior thereof. The elements adjacent their exposed ends are seal welded to the sleeves to prevent leakage of liquid from the vessel interior. A mechanical back-up connection in the form of a threaded nut and bushing arrangement is also provided. Its purpose is to prevent axial retrograde movement of the heater element in the event of failure of the weld, which movement could cause considerable damage due to the high fluid pressure present within the pressure vessel.

It occasionally happens that heater elements malfunction and must be repaired or replaced. Moreover, pressure boundary welds such as those between pressurizer heater sleeves and the pressurizer shell clad require periodic inspection which requires the removal of an operative heater element. In the past, removal of a heater element for any of the foregoing reasons required either destruction of the element caused by severing it and its protective sleeve adjacent the seal weld or prolonged exposure of personnel to a highly radioactive environment when the element was removed intact by manual grinding of the seal weld. Both of these forms of heater element removal are undesireable.

It is to the alleviation of this problem that the present invention is directed.

SUMMARY OF THE INVENTION

According to the present invention means are provided for removing the welded connection between a heater element and its protective sleeve in a pressurizer assembly. The weld is removed in such a manner as will prevent damage to either the heater element or the sleeve such that their reuse will be permitted. A weld cutting tool is arranged with radially extending cutter bits and is adapted to be rotatably driven in order to remove the weld by means of a circumferential cut. The body of the cutting tool is split to permit its engagement with the annular weld about the heater element and the sleeve. The tool is operated by a rotary drive motor and connection of the tool to the motor is effected by means of a drive collar arranged to engage the nut member of the back-up connection which, in turn, serves to maintain the tool body in assembled relation as well as to connect it to the collar.

By means of the invention more effective use of pressurizer heater elements is permitted by virtue of the fact that, in the event of a need for tool removal, the heater elements can be removed intact from the assembly and thereafter reassembled thereto for reuse.

DESCRIPTION OF THE DRAWINGS

FIG. 1 is a schematic representation of a typical nuclear vapor supply of the pressurized water type;

FIG. 2 is a sectional elevation of a pressurizer heater element assembly;

FIG. 3 is a sectional elevation of the apparatus of the present invention assembled in operative relation to the heater element of FIG. 2;

FIG. 4 is an exploded view of the cutting tool of the present invention;

FIG. 5 is a view taken along line 5—5 of FIG. 4;

FIG. 6 is a view taken along line 6—6 of FIG. 4;

DESCRIPTION OF THE PREFERRED EMBODIMENT OF THE INVENTION

Figure 7:
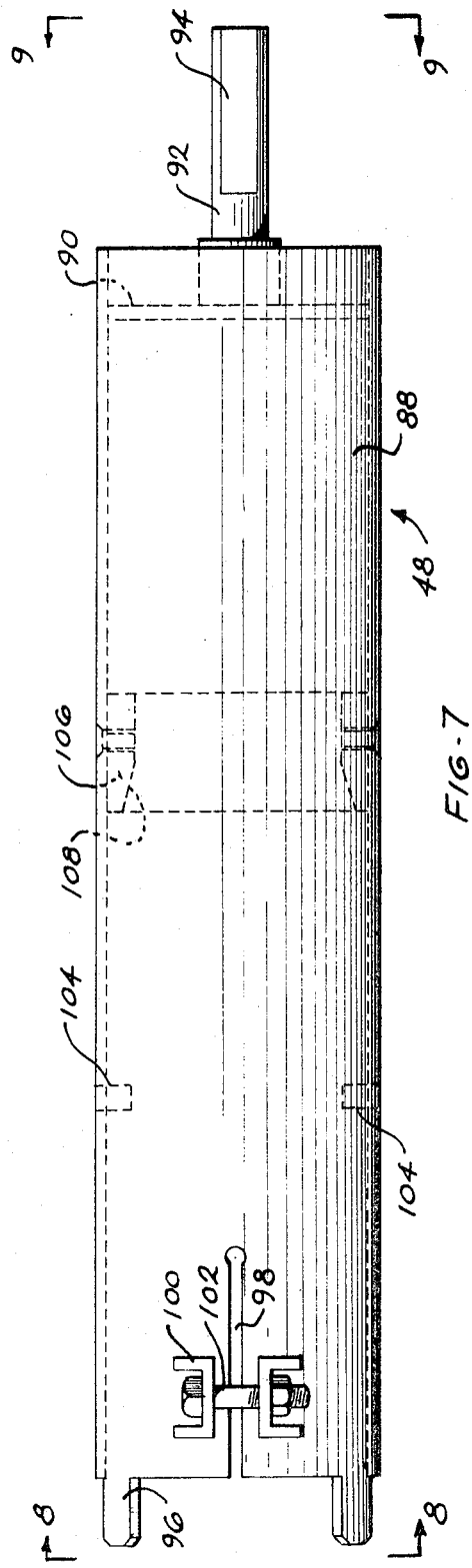
FIG. 7 is an elevational view of a drive collar according to the present invention.

Referring to FIG. 1 there is shown a schematic representation of nuclear vapor supply system 10 that is typical of those of the pressurized water type. It comprises a neutronic reactor 12 having a primary coolant system including lines 14 and 16 for circulating a primary coolant, such as pressurized light water, between the reactor and a vapor generator 18 in which a second liquid is vaporized for subsequent use in a prime mover (not shown). The primary coolant system includes a pressurizer 20 that communicates with the line 14 and operates to maintain the fluid pressure in the system within predetermined limits during various stages of system operation.

As is well known, the pressurizer 20 comprises a closed vessel containing a body of liquid that forms part of the primary coolant circulated through the system. The coolant contained within the vessel which is maintained at saturated temperature, immerses the operating ends of a plurality of electrical heating elements 22. The heating elements 22 are arranged to controllably add heat to the enclosed liquid thereby to adjustably maintain a vapor head within the vessel that regulates the fluid pressure of the primary coolant system.

In FIG. 2 there is illustrated in greater detail the assembled connection of a heater element 22 to the pressurizer vessel 20. As shown, the heater element 22 includes an elongated cylindrical shaft 24 adapted to extend upwardly through the bottom end of the vessel. At its external end shaft 24 is provided with an enlarged head 26 that serves to connect the element 22 with a source of electrical power. The assembly includes a sleeve 28 attached within a bore in the lower vessel closure. The sleeve is welded at its inner end to the cladded interior surface 30 thereof. The shaft 24 of the heater element extends through the sleeve 28 and is welded thereto at the exterior end thereof as at 32 in order to effect a fluid-tight seal between the heater element and the sleeve.

The assembly also includes a mechanical back-up connection, indicated generally as 34, that serves to protect against retrograde movement of the heater element from the sleeve in the event of rupture or failure of the seal weld 32. This connection comprises an annular, externally threaded bushing 36 securely fixed, as by means of welding, to the external surface of sleeve 28. A hollow cylindrical nut 38 having internal threads is telescopically mounted upon the heater element shaft 24 and threadedly attaches with the bushing 36. The rear or bottom end of the nut 38 is formed with an annular shoulder surface 40 that is sized to cooperate with a stop ring 42 that is attached to the heater element shaft 24. When the nut 38 is threaded to the bushing 36 the stop ring 42 abuts the shoulder 40 thereby preventing the heater element 22 from being propelled from the sleeve under the influence of high fluid pressure existing within the vessel in the event of failure of the weld 32.

According to the present invention means are provided for removing the seal weld 32 between the heater element 22 and sleeve 28 in a manner as will prevent damage to these two pressurizer components thus to enable their reuse. The manner contemplated includes a rotary cutting tool 44 that is adapted for operation by a drive motor 46. The connection between the tool 44 and drive motor 46 is effected by means of a drive collar 48 that is adapted to drivingly attach the hollow nut of 38 which forms part of the mechanical back-up connection and which, in turn, is arranged to connect the cutting tool 44.

The cutting tool 44 according to the invention is shown in detail in FIGS. 4, 5 and 6 of the drawing. The tool body 50 comprises a pair of body segments 50a and 50b which, when assembled, define an annular member having a central opening 56 that receives the shaft 24 and into which a plurality, here shown as being three in number, of radially extending weld cutting bits 58 extend. The cutting bits 58 are rectangular in section and are retained in the tool body 50 within cylindrical sleeves 60 that are pressed into circumferentially spaced radial bores through the body. The sleeves 60 each contain a central bore, the forward portion 62 of which is of rectangular cross section to receive the respective bits 58 and the rearward portion 64 of which contains an internal thread for reception of set screws 66. The set screws 66 serve to enable radial adjustment of the bits with respect to the axis of the tool in order that the tool can operate on welds of varying diameters. Other set screws 68 are disposed normally to the axis of the respective bits and serve to lock the bits in their adjusted position within the tool body.

The element indicated as 59 has essentially the same structure as the cutting bits 58 except to the extent that instead of being provided with a cutting head the element is formed with a bronze bearing surface. This element, like the cutting bits 58, is radially adjustable, by means of set screw 66 and serves to set the effective radial distance between the axis of the tool and the cutting bits.

The outer periphery of the body halves, 50a and 50b, are each provided with a plurality of spaced rectangular grooves 70 adapted to connect the drive collar 48 as herein after described. Each groove 70 extends longitudinally of the body halves and contains chamfered edges 72 along one side to facilitate reception of the drive collar.

The tool body 60 is preferably provided with an arcuate bearing surface 74, here shown on body half 50b and interrupted by an opening 76 for one of the cutting bits 58. This surface is placed in substantial alignment with the location of the cutting bits 58 and functions primarily to center the cutting tool body 50 about the heater element shaft 24 prior to operation of apparatus.

The tool body half 50b is provided with oppositely spaced radial flanges 78 containing through-openings for reception of the cap screws 52, the threaded ends of which are connected in threaded bores 80 provided in body half 50a. Assembly of the two body halves 50a and 50b is facilitated by centering pins 54 which, in the disclosed arrangement, have one end pressed oppositely spaced into bores provided on the facing surface of body half 50a. The other body half 50b contains bores 82 of slightly greater diameter for sliding reception of the other ends of the centering pins 54.

As best shown in FIG. 5 the tool body halves 50a and 50b are provided with axial extentions 84 that define an axially elongated cylinder formed with an external thread 86. According to the invention this thread 86 conforms with that on the bushing 36 that forms part of the mechanical back-up connection thereby enabling use of the hollow nut 38 of that assembly as the connector member for mounting the segments 50a and 50b of the tool body.

Figure 9:
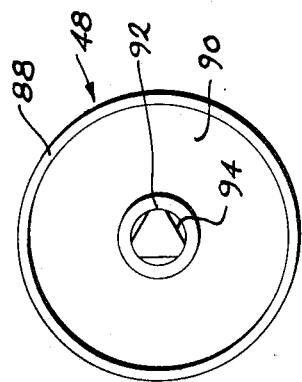
FIG. 9 is a view taken along line 9—9 of FIG. 7.
Figure 8:
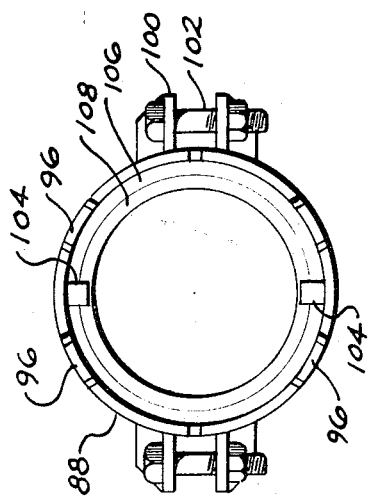
FIG. 8 is a view taken along line 8—8 of FIG. 7.
Figure 13:
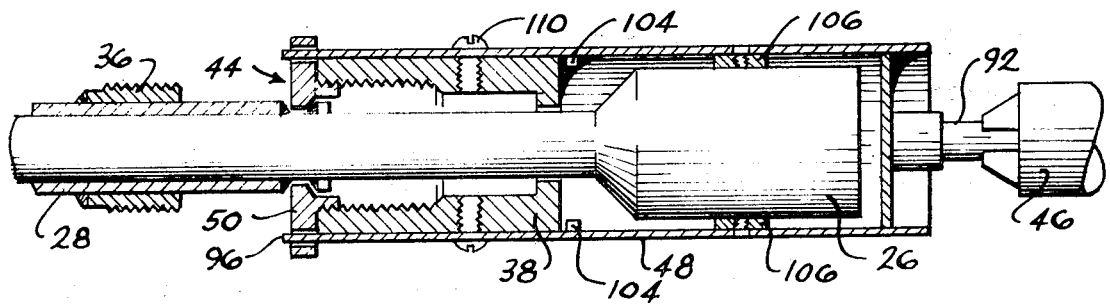

FIGS. 7, 8 and 9 illustrate in detail the drive collar 48 according to the present invention. This component of the apparatus cooperates with the hollow nut 38 to establish connection between the cutting tool 44 and drive motor 46. The collar 48 has an axially elongated, hollow cylindrical body 88 whose interior is sized to extend over the exposed end of the heater element 22 as shown in FIG. 13. The rearward end of the body 88 is closed by an end plate 90 that axially mounts a shaft 92 for connection with a drive motor 46. As shown, the shaft 92 may contain a plurality of circumferentially spaced, longitudinal flats 94 for engaging chuck elements associated with the drive motor. The leading end of the body 88 is open and provided with four circumferentially spaced longitudinal protuberances 96 that are adapted to engage the respective grooves 70 in the cutting tool body 50.

Adjacent its leading end, the wall of the collar body 88 is provided with a pair of diametrically opposed slots 98 which serve to lend flexibility in the body at this end. Flange pairs 100 are disposed adjacent the respective slots 98 with the flanges in each pair being oppositely spaced from the associated slots and containing openings to mount bolt connectors 102. In this way a relatively tight engagement can be established between the drive collar 48 and the hollow nut 38 upon assembly of the apparatus thereby to reduce the vibration or chatter that could occur between these members during the cutting operation.

The collar body 88 further includes a pair of limit pins 104 provided within the interior thereof. The pins 104 are preferably located at diametrically opposite positions with each being welded or otherwise secured to the interior surface of the body and extending radially therefrom a distance sufficient to enable the pins to engage the rear end of the nut 38. The pins 104 are so disposed to prevent retrograde movement of the nut 38 within the interior of the collar body 88. By restricting the location of the nut to closely adjacent the leading end of the drive collar, connection of the nut to the segments of the tool body 50 is greatly facilitated.

The interior of the drive collar 48 is further provided with an annular bushing 106 that is suitably secured, as by means of threaded connectors, to the inner surface of the body collar 88. The bushing 106 contains a central bore 108 having a tapered surface opening toward the open end of the collar thereby to enhance sliding reception of the bushing upon the enlarged head 26 of the heater element 22 when the drive collar is extended over the latter. The minor diameter of the bore 108 is sized such that the bushing can slidingly engage the head 28 thereby serving to center the apparatus upon the heater element 22 during operation of the cutting tool.

Figure 10:
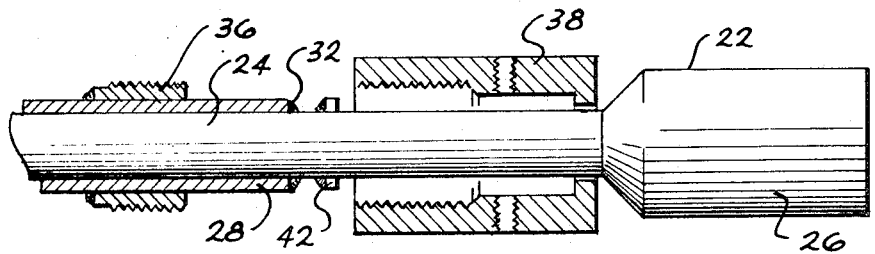
FIGS. 10–13 are views illustrating the various steps employed in removing a heater element seal weld according to the present invention.
Figure 11:
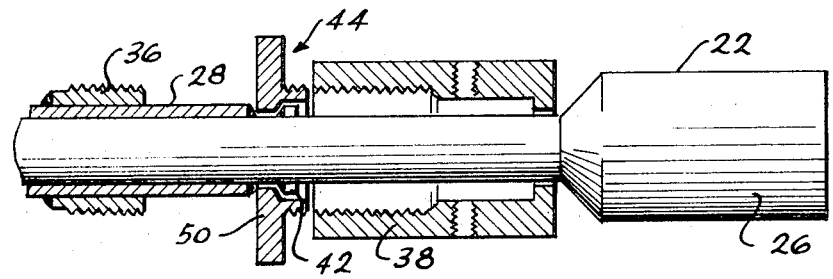
Figure 12:
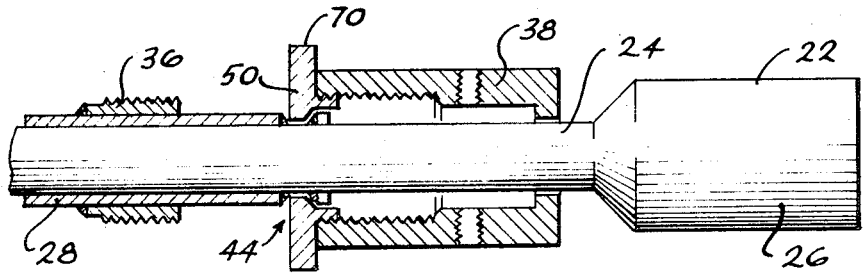

The operation of the invention is described with particular reference to FIGS. 10–13 which disclose the apparatus in various stages of assembly. Beginning with a pressurizer heater element assembly as shown in FIG. 2, the mode of utilizing the present invention is begun, as shown in FIG. 10, by unthreading the hollow nut 38 from the bushing 36 of the mechanical back-up connection and moving the former axially along the heater element shaft 24 so as to expose the seal weld 32 to be removed. Next, the segments of the body 50 of the cutting tool 44 are assembled upon the shaft 24 closely adjacent the weld 32. After the cap screws 52 have been tightened to engage the body segments about the heater element shaft the hollow nut 38 is moved along the shaft and threadedly connected about the external thread 86 on the axial edge 84 of the body 50 as shown in FIG. 12. With the set screws 68 loose (FIG. 4), set screws 66 are manipulated to move the respective cutting bits 58 into concentric engagement with the weld 32. Thereafter, the drive collar 48 is axially extended over the assembly with the protuberances 96 placed in engagement in the drive grooves 70 in the tool body 50. Bolts 102 are tightened to ensure a snug fit between the collar 48 and the nut and tool assembly. Threaded connector 110, as shown in FIG. 13, may additionally be employed to positively lock the drive collar 48 to the nut 38. Rotary movement of the cutting tool 44 is effected by attaching the drive motor 46 to the shaft 92 of the drive collar. The apparatus is manually manipulated and the drive motor 46 operated until the seal weld 32 has been removed thus to sever the connection. Metal chips and any small amount of leakage liquid that may have been disposed behind the seal are discharged into the interior of the drive collar 48 thus to protect the workman operating the tool.

It will be appreciated that once the seal weld 32 has been removed the heater element 22 can be simply slidingly removed, still intact, from the pressurizer sleeve 28. The desired maintenance, repair or inspection can then be performed and thereafter the heater element returned to its operative position within the sleeve 28 to be reused.

The present invention therefore provides a simple and inexpensive means for quickly removing heater elements from assembly in a pressure vessel in a manner as will maintain the heater element intact. In this way, an inoperative heater element can simply be repaired and thereafter returned to service. This is in contradistinction to prior art arrangements which require complete severence of the heater element in order to remove it from the assembly within the pressurizer thereby compelling its replacement which results in a considerably more expensive operation of the pressurizer.

It will be understood that various changes in the details, materials, and arrangement of parts which have been herein described and illustrated in order to explain the nature of the invention may be made by those skilled in the art within the principle and scope of the invention as expressed in the claims.

What is claimed is:

1. For use in a pressurizer organization including a substantially closed vessel, a sleeve attached at its leading end to a bore in said vessel, a heater element, cylindrical in section and longer than said sleeve extending into said vessel in sheathed relation within said sleeve, and a seal weld between said sleeve and said heater element adjacent and exposed ends thereof, apparatus for removing said seal weld comprising:
   a. a rotatable weld cutting tool including a body having a central opening for reception upon said heater element and radially adjustable cutting bits extending into said opening and engageable with said seal weld;
   b. means for rotatably driving said weld cutting tool; and
   c. means for connecting said weld cutting tool to said tool-driving means including an elongated, hollow cylindrical body member concentrically disposed about the exposed end of said heater element, means on said body member for radially engaging the body of said cutting tool and other means axially spaced from said tool-engaging means for attaching said body member to said tool-driving means.

2. Apparatus as recited in claim 1 wherein the body of said cutting tool contains a plurality of circumferentially spaced, longitudinally extending grooves about the outer periphery thereof and said body member included protuberances extending from the leading end thereof adapted for engagement with said grooves.

3. Apparatus as recited in claim 2 wherein the body of said cutting tool is diametrically split to define a pair of body segments and means for detachably joining said body segments about said heater element.

4. For use in a pressurizer organization including a substantially closed vessel, a sleeve attached at its leading end to a bore in said vessel, a cylindrical heater element having an elongated shaft and an enlarged head at one end thereof, said shaft being longer than said sleeve and extending into said vessel in sheathed relation within said sleeve, a seal weld between said sleeve and said heater element shaft adjacent the exposed end thereof and a mechanical back-up connection including a nut member concentrically slidably mounted on said heater element shaft for threaded connection to said sleeve, apparatus for removing said seal weld comprising:
   a. a rotatable weld cutting tool including:
      i. a plurality of segments arranged to define a cutter body having a central opening for reception upon the shaft of said heater element, said segments including means defining an externally threaded axial appendage for reception of said nut member for detachable assembly of said segments;

ii. a plurality of radial bores extending through said body segments, iii. cutting bits adjustably mounted in said radial bores and extending into said central opening for engagement with said seal weld;

b. motor drive means for rotating said weld cutting tool; and c. means for connecting said weld cutting tool to said motor drive means.

5. Apparatus as recited in claim 4 wherein the means for connecting the weld cutting tool to said motor drive means comprises:

a. an elongated, hollow cylindrical body member having an open leading end for concentric disposition over the exposed heater element head and shaft portion, b. means on said body member for radially engaging the body of said cutting tool, and c. means axially spaced from said tool-engaging means for attaching said body member to said tool-driving means.

6. Apparatus as recited in claim 5 wherein said body member is closed at its rearward end to define a substantially closed receptacle when assembled to said cutting tool body.

7. Apparatus as recited in claim 5 wherein said nut body segments are provided with circumferentially spaced, longitudinally extending grooves about their outer periphery and the body member of said connecting means includes a plurality of circumferentially spaced, longitudinally extending protuberances about its leading end for reception in said grooves.

* * * * *